(12) United States Patent
Kim et al.

(10) Patent No.: US 9,315,699 B2
(45) Date of Patent: Apr. 19, 2016

(54) PHOTOCURABLE ADHESIVE COMPOSITION

(71) Applicant: LG Hausys, Ltd., Seoul (KR)

(72) Inventors: Sang Hwan Kim, Gunpo-si (KR); Yong Hoon Lee, Cheongju-si (KR); Dai Hyun Kim, Seoul (KR); Won Gu Choi, Anyang-si (KR); Jang Soon Kim, Seongnam-si (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 14/424,715

(22) PCT Filed: Sep. 4, 2013

(86) PCT No.: PCT/KR2013/007966
§ 371 (c)(1),
(2) Date: Feb. 27, 2015

(87) PCT Pub. No.: WO2014/042385
PCT Pub. Date: Mar. 20, 2014

(65) Prior Publication Data
US 2015/0203726 A1    Jul. 23, 2015

(30) Foreign Application Priority Data

Sep. 13, 2012 (KR) .................. 10-2012-0101328

(51) Int. Cl.
C08F 2/46 (2006.01)
C08F 2/50 (2006.01)
C08G 61/04 (2006.01)
C09J 163/00 (2006.01)
C09J 163/04 (2006.01)

(52) U.S. Cl.
CPC .............. *C09J 163/00* (2013.01); *C09J 163/04* (2013.01); *C08L 2205/02* (2013.01)

(58) Field of Classification Search
CPC ............................ C09J 163/04; C09J 163/00
USPC .................. 522/31, 6, 189, 184, 1; 520/1
See application file for complete search history.

(56) References Cited

U.S. PATENT DOCUMENTS

| | | | |
|---|---|---|---|
| 4,835,193 A * | 5/1989 | Hayase et al. | .................. 522/15 |
| 6,312,801 B1 | 11/2001 | Kim et al. | |
| 2010/0133703 A1 | 6/2010 | Karasawa et al. | |
| 2014/0302430 A1* | 10/2014 | Nawrocki et al. | .............. 430/18 |

FOREIGN PATENT DOCUMENTS

| | | |
|---|---|---|
| DE | 102010028586 A | 11/2011 |
| JP | 05315742 A | 11/1993 |
| JP | 08100163 A | 4/1996 |
| JP | 09279117 A | 10/1997 |
| JP | 2012057057 A | 3/2012 |
| KR | 100302212 B1 | 9/2001 |
| KR | 101043609 B1 | 6/2011 |
| KR | 20120030981 A | 3/2012 |
| WO | 2013/036502 * | 3/2013 |

OTHER PUBLICATIONS

Chapman and Hall, Epoxy Resins and Curing agents vol. 1, Oct. 31, 1993, Springer, 3rd Edition, p. 181.*
International Search Report for PCT/KR2013/007966 mailed on Nov. 27, 2013.
European Search Report dated Aug. 28, 2015 in connection with the counterpart European Patent Application No. 13837731.2.

* cited by examiner

*Primary Examiner* — Ling Choi
*Assistant Examiner* — Jessica E Whiteley
(74) *Attorney, Agent, or Firm* — Hauptman Ham, LLP

(57) ABSTRACT

Provided is an adhesive composition comprising: a thermosetting epoxy resin formed with an epoxy copolymer containing a hydroxyl group; and a UV curable epoxy resin having an epoxy equivalence of 100 g/eq to 500 g/eq.

11 Claims, No Drawings

PHOTOCURABLE ADHESIVE COMPOSITION

TECHNICAL FIELD

The present invention relates to a photocurable adhesive composition.

BACKGROUND ART

Generally, digital paper displays are spotlighted as next generation displays succeeding liquid crystal displays, plasma display panels and electroluminescent devices, and are evaluated as ideally suited to application to reflective displays. In particular, electronic paper is a display capable of displaying letters or images using a flexible substrate such as a thin plastic substrate in which millions of beads are sprayed into oil holes. Electronic paper can be recycled millions of times and is anticipated as a material replacing existing print media, such as books, newspapers, magazines, and the like. Further, electronic paper has much lower production costs than existing flat display panels, and exhibits superior energy efficiency since electronic paper does not require backlighting and continuous recharge as in static screens and thus can be driven even by extremely small energy. Furthermore, since electronic paper is extremely clear, exhibits wide viewing angle and also has a memory function that prevent letters from disappearing when power is not supplied, electronic paper has a possibility of being widely used for public bulletin boards, advertisements, electronic books and the like.

The present invention relates to an adhesive composition for electronic materials or electronic paper. In particular, since an adhesive composition for electronic paper is coated onto an upper side of an ink layer prepared using a highly hydrophobic solvent and is bonded to a protective film through photocuring, the electronic paper can exhibit deterioration in high-temperature reliability and durability due to low compatibility between the solvent and the adhesive composition. Particularly, since the adhesive composition exhibits differences in surface energy and contact angle between before and after photocuring, the adhesive composition cannot provide sufficient adhesion to the protective film.

Although Korean Patent No. 10-1043609 discloses a composition for photocurable adhesive tapes including an acrylic copolymer, a thermal curing agent and a photoinitiator, this composition is aimed at securing good peel strength after UV curing and suffers from reduction in surface energy after UV curing, it is difficult to consider that the document discloses properties allowing contact angle or surface energy to be maintained before and after UV curing.

DISCLOSURE

Technical Problem

It is one aspect of the present invention to provide an adhesive composition which exhibits excellent adhesion even with respect to highly hydrophobic solvents and secures reliability at high temperature.

Technical Solution

In accordance with one aspect of the present invention, an adhesive composition includes: a thermally curable epoxy resin formed of a hydroxyl group-containing epoxy copolymer; and a UV curable epoxy resin having an epoxy equivalent weight of 100 g/eq to 500 g/eq.

The epoxy copolymer may have a structure in which the hydroxyl group is substituted into a main chain thereof.

The epoxy copolymer may have a weight average molecular weight of about 20,000 to about 70,000.

The epoxy copolymer may have a glass transition temperature of about 50° C. to about 90° C.

The thermally curable epoxy resin may have a hydroxyl group equivalent weight of about 200 g/eq to about 400 g/eq.

The UV curable epoxy resin may include a novolac type epoxy resin.

The novolac type epoxy resin may include any one selected from the group consisting of phenol novolac type, cresol novolac type, cycloaliphatic novolac type, cycloaliphatic novolac type modified, bisphenol novolac type, biphenyl novolac type, naphthol novolac type epoxy resins, and combinations thereof.

The UV curable epoxy resin may have a glass transition temperature of about 60° C. to about 90° C.

The thermally curable epoxy resin may be present in an amount of about 10 parts by weight to about 60 parts by weight based on 100 parts by weight of the UV curable epoxy resin.

The adhesive composition may further include a cationic photoinitiator.

The cationic photoinitiator may be present in an amount of about 5 parts by weight to about 15 parts by weight based on 100 parts by weight of the UV curable epoxy resin.

The adhesive composition may have a difference in surface energy of about 2 dyne/cm to about 4 dyne/cm between before and after photocuring.

The adhesive composition may have a difference in contact angle of about 5° to about 20° between before and after photocuring.

Advantageous Effects

Since the adhesive composition has dense curing density before and after photocuring and thus entails a small change of water contact angle between before and after photocuring, the adhesive composition can maintain high-temperature reliability.

In addition, the adhesive composition can be usefully used as an adhesive tape and the like in fields using electrical materials and highly hydrophobic solvents on the basis of high-temperature reliability.

BEST MODE

Hereinafter, embodiments of the present invention will be described in detail. It should be understood that the following embodiments are provided for illustration only and are not to be construed in any way as limiting the present invention. The scope of the present invention should be defined only by the accompanying claims and equivalents thereof.

Adhesive Composition

In accordance with one aspect of the present invention, an adhesive composition includes: a thermally curable epoxy resin formed of a hydroxyl group-containing epoxy copolymer; and a UV curable epoxy resin having an epoxy equivalent weight of 100 g/eq to 500 g/eq.

The thermally curable epoxy resin is formed of the hydroxyl group-containing epoxy copolymer, and the epoxy copolymer may be used as a binder of the adhesive composition. Since the epoxy copolymer includes the hydroxyl group and thus maintains hydrophilicity after photocuring as well as before photocuring, the epoxy copolymer does not suffer from swelling or the like when brought into contact with a hydrophobic solvent. In addition, since the thermally curable epoxy resin includes the hydroxyl group-containing epoxy copolymer and thus exhibits excellent chemical resistance to hydrophobic solvents, the thermally curable epoxy resin has an outstanding effect in fields using electrophoresis and requiring resistance to halocarbon solvents or dodecane solvents.

The epoxy copolymer has a structure in which the hydroxyl group is substituted into a main chain thereof, and may have a comb-like shape. A side branch connected by monomer molecules branched off from various branch points on a main chain of a copolymer is referred to as a branch, and the epoxy copolymer may have a comb-like shape formed by substituting a branch thereof with the hydroxyl group.

If the hydroxyl group is not substituted into the main chain of the epoxy copolymer, the adhesive composition exhibits insignificant crosslinking density efficiency upon thermal curing and thus a film produced from the adhesive composition is not dense. On the contrary, when the hydroxyl group is substituted into the main chain of the epoxy copolymer, the adhesive composition can very efficiently increase crosslinking density upon thermal curing.

The hydroxyl group included in the epoxy copolymer may be any one of primary, secondary and tertiary hydroxyl groups, without being limited thereto. Specifically, a primary or secondary hydroxyl group is used, whereby other materials added to the thermally curable epoxy resin in addition to the epoxy copolymer do not suffer from yellowing or denaturation due to heat.

Specifically, although the epoxy copolymer may be any epoxy copolymer without limitation so long as the epoxy copolymer includes a hydroxyl group, the epoxy copolymer may include a bisphenol structure having a secondary hydroxyl group. In addition, the epoxy copolymer may include a structure represented by Formula 1, wherein at least n (integer) ranges from about 10 to about 60, specifically about 30 to about 50.

[Formula 1]

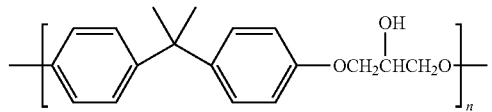

The epoxy copolymer may have a weight average molecular weight of about 20,000 to about 70,000, specifically about 40,000 to about 60,000. Although typical photocurable adhesive compositions generally contain an ether polyol or polycarbonate polyol having a molecular weight of about 10,000 as a binder, since the molecular weight of the epoxy copolymer, which can be used as a binder of the adhesive composition, is maintained within the range as set forth above, the adhesive composition exhibits excellent compatibility with a highly hydrophobic solvent after photocuring, thereby suppressing white turbidity which causes scattering on an electronic material or electronic paper using the adhesive composition.

The epoxy copolymer may have a glass transition temperature of about 50° C. to about 95° C. For example, when the epoxy copolymer is used as a binder of the adhesive composition and has a glass transition temperature of about 70° C. to about 90° C., the epoxy copolymer can be present in a solid form at room temperature due to crystallization thereof.

Specifically, if the glass transition temperature of the epoxy copolymer is less than about 50° C., an adhesive tape formed of the adhesive composition can suffer from stickiness, cannot cope with a highly hydrophobic solvent due to increased peel strength with respect to a protective film applied thereto, and can provide residues of the adhesive composition when peeled off. In addition, if the glass transition temperature of the epoxy copolymer is greater than about 95° C., the adhesive composition exhibits extremely low peel strength with respect to the protective film applied thereto due to extreme hardness after curing, and has difficulty in realizing properties as adhesives due to deterioration in adhesion even when applied to general plastic substrates.

Although an acrylic polyol having a glass transition temperature of about 50° C. or more is generally used as a photocurable adhesive composition for electronic materials or electronic paper, the acrylic polyol exhibits deterioration in adhesion to a substrate such as protective films and the like upon coating, and can exhibit significant deterioration in heat resistance and chemical resistance to hydrophobic solvents. Therefore, to overcome this problem, the epoxy copolymer having a glass transition temperature within the range as set forth above is introduced, whereby the adhesive composition exhibits significantly good adhesion to a protective film after coating, and significantly good heat resistance and chemical resistance with respect to hydrophobic solvents.

The thermally curable epoxy resin formed of the epoxy copolymer may have a hydroxyl group equivalent weight of about 200 g/eq et about 400 g/eq. The hydroxyl group equivalent weight refers to the number of grams of a resin including 1 gram equivalent weight of a hydroxyl group. When the hydroxyl group equivalent weight is too low, there is difficulty coating of the adhesive composition due to relatively low hydrophilicity thereof, and when the hydroxyl group equivalent weight is too high, there is a concern that the adhesive composition exhibits reduced resistance to hydrophobic solvents. Thus, it is advantageous to maintain the hydroxyl group equivalent weight within the range as set forth above in that the adhesive composition can secure coatability and chemical resistance.

The UV curable epoxy resin included in the adhesive composition according to the embodiment of the invention may have an epoxy equivalent weight of about 100 g/eq to about 500 g/eq. The epoxy equivalent weight refers to the number of grams of a resin including 1 gram equivalent weight of an epoxy group. When the epoxy equivalent weight is too low, the adhesive composition is likely to gelate between individual resins and has difficulty in synthesis, and can exhibit deterioration in curability upon photocuring and in abrasion resistance after photocuring.

Therefore, the UV curable epoxy resin has the epoxy equivalent weight within the range as set forth above, whereby a uniform adhesive composition can be advantageously formed. In addition, the adhesive composition simultaneously includes the UV curable epoxy resin and the thermally curable epoxy resin having a hydroxyl group equivalent weight of about 200 g/eq to about 400 g/eq, thereby providing high curing density efficiency upon curing. The adhesive composition can maintain surface hydrophilicity due to good curing density and thus exhibit excellent chemical resistance to hydrophobic solvents, whereby usage of the adhesive composition can be expanded.

Specifically, if the epoxy equivalent weight is less than about 100 g/eq, a film formed of the adhesive composition is extremely fragile due to low molecular weight of the adhesive composition after curing, and can suffer from fine chipping upon cutting of the film and thus cause defects. In addition, if the epoxy equivalent weight is greater than about 500 g/eq, contact angle with respect to water after photocuring can be increased due to increase in hydrocarbon length, which is a factor influencing hydrophobicity.

The UV curable epoxy resin may be a novolac type epoxy resin. Due to the novolac type epoxy resin, the adhesive composition can produce a cured product exhibiting high heat resistance, and also exhibits excellent chemical resistance and adhesion. The novolac type epoxy resin may include any one selected from the group consisting of phenol novolac type, cresol novolac type, cycloaliphatic novolac type, cycloaliphatic novolac type modified, bisphenol novolac type, biphenyl novolac type, naphthol novolac type epoxy resins, and combinations thereof. For example, the novolac type epoxy resin may include: CEL2021P, Celloxide 2081, Epolead GT401, Celloxide 3000, and EHPE3150 (Dicel Co., Ltd.); S-21, S-28, S-50, S-60, S-182, S-186 (Synasia Co., Ltd.), and the like.

In addition, the UV curable epoxy resin may have a glass transition temperature of about 60° C. to about 90° C. Within this range, the UV curable epoxy resin can maintain a semi-cured state, there is no residue when the adhesive composition including the UV curable epoxy resin is coated and cut, and the adhesive composition exhibits good heat resistance even after photocuring.

For example, the UV curable epoxy resin may include a cycloaliphatic novolac type epoxy resin, and may have an epoxy equivalent weight of about 100 g/eq to about 300 g/eq and a glass transition temperature of at least about 60° C. or more.

Specifically, the cycloaliphatic novolac type epoxy resin may have a glass transition temperature of about 60° C. to about 90° C., and may be present in a solid state at room temperature. When an adhesive tape is formed of the adhesive composition including the cycloaliphatic novolac type epoxy resin which is a liquid at room temperature, since the adhesive composition becomes extremely sticky depending upon external temperature, the adhesive tape exhibits deterioration in adhesion due to increased peel strength with respect to a protective film depending upon storage conditions, a peeling-off mark is transferred when the adhesive tape is peeled off, and the adhesive composition remains as residues. Thus, the adhesive tape has difficulty in use thereof.

The thermally curable epoxy resin may be present in an amount of about 10 parts by weight to about 60 parts by weight based on 100 parts by weight of the UV curable epoxy resin. In formation of the adhesive composition, amounts of the components excluding a solvent are as described above. When the adhesive composition, which includes the thermally curable epoxy resin in the amount as set forth above based on 100 parts by weight of the UV curable epoxy resin, is coated to be used as a protective film, the protective film does not leave residues upon lamination in a semi-cured state, and can be stored for a long period of time.

The adhesive composition may further include a cationic photoinitiator. The photoinitiator may include at least one of various cationic UV cleavable initiators, without being limited thereto. These cationic UV cleavable initiators may be used alone or in combination thereof. The UV cleavable initiators may include onium salt UV cleavable initiators.

The onium salt UV cleavable initiators may include diaryliodonium salts, triarylsulfonium salts, triarylsulfonium salts, tetraarylphosphonium salts, aryl diazonium salts, and the like. For example, diaryliodonium salts may be a compound represented by "Y2I+X—" (where Y is an aryl group capable of having a substituent group and X— is a non-nucleophilic or non-basic anion). The non-nucleophilic or non-basic anion of X— may include, for example, $SbF_6-$, $SbCl_6-$, $BF_4-$, $[B(C_6H_5)_4]-$, $[B(C_6F_5)_4]-$, $[B(C_6H_4CF_3)_4]-$, $[(C_6F_5)_2BF_2]-$, $[C_6F_5BF_3]-$, $[B(C_6H_3F_2)_4]-$, $AsF_6-$, $PF_6-$, $HSO_4-$, $ClO_4-$, and the like.

In addition, triarylsulfonium salts, triarylsulfonium salts, tetraarylphosphonium salts and aryl diazonium salts may include compounds corresponding to the diaryliodonium salts. Specifically, triarylsulfonium salts, triarylsulfonium salts, tetraarylphosphonium salts and aryl diazonium salts may include compounds represented by "Y3S+X—", "Y3Se+X—", "Y4P+X—" and "YN2+X—", respectively (where Y is an aryl group capable of having a substituent group and X— is a non-nucleophilic or non-basic anion).

The onium salt UV cleavable initiators may include antimony atom-containing UV cleavable initiators (antimony UV cleavable initiators) and boron atom-containing UV cleavable initiators (boron UV cleavable initiators).

The cationic photoinitiator may be present in an amount of about 5 parts by weight to about 15 parts by weight based on 100 parts by weight of the UV curable epoxy resin. Within this range, a large number of molecules having a short bond length are not generated, whereby the adhesive composition can secure durability.

Photocuring of the adhesive composition according to the present invention may be performed using: light such as far ultraviolet light, ultraviolet light, near ultraviolet light, infrared light, and the like; electromagnetic waves such as X-rays, γ-rays, and the like; electron beams; proton beams; neutron beams, and the like. However, curing by UV irradiation is advantageous in consideration of curing rate, ease of acquisition of an irradiation apparatus, price, and the like.

In addition, a light source for performing UV irradiation may include high-pressure mercury lamps, electrodeless lamps, ultrahigh-pressure mercury lamps, carbon arc lamps, xenon lamps, metal halide lamps, chemical lamps, black-lights, and the like. When the light source is a high-pressure mercury lamp, UV irradiation is performed, for example, at a dose of about 5 $mJ/cm^2$ to about 3000 $mJ/cm^2$, specifically about 1500 $mJ/cm^2$ to about 2000 $mJ/cm^2$.

Further, although irradiation time varies depending upon types of light sources, distance between a light source and a coating surface, coating thickness and other conditions, the irradiation time generally ranges from a few seconds to tens of seconds, and may be several tenths of a second in some cases.

The adhesive composition may have a difference in surface energy of about 2 dyne/cm to about 3 dyne/cm between before and after photocuring. Since the thermally curable epoxy resin is formed of the hydroxyl group-containing epoxy copolymer, the adhesive composition includes a certain amount or more of hydrophilic groups. Thus, the adhesive composition does not suffer from swelling due to opposite properties to the hydrophobic solvents and can minimize a change in surface energy by maintaining hydrophilicity even after photocuring.

Generally, when a photocurable adhesive composition is applied to a highly hydrophobic solvent such as halocarbon and dodecane used for electronic materials or electronic paper, due to insufficient compatibility between the solvent and the adhesive composition, the adhesive composition can suffer from swelling due to absorption of the solvent and thus exhibits deterioration in high-temperature reliability.

However, in the adhesive composition including the thermally curable epoxy resin and the UV curable epoxy resin, specifically, since the thermally curable epoxy resin is formed of the hydroxyl group-containing epoxy copolymer, the adhesive composition maintains hydrophilicity even after photocuring and thus does not suffer from swelling due to hydrophobic solvents. Thus, since the adhesive composition entails a small change in surface energy between before and after photocuring and thus does not suffer from a phenomenon of shifting towards low surface energy, the adhesive composition can maintain high-temperature reliability.

In addition, the adhesive composition may have a difference in contact angle of about 5° to about 20°, specifically about 5° to about 10° between before and after photocuring. The contact angle refers to an angle between a liquid droplet and a solid surface in thermodynamic equilibrium. The contact angle is a measure showing wettability of the solid surface and is measured using a water droplet in most cases. Here, low contact angle represents high wettability (hydrophilicity) and high surface energy, and high contact angle represents low wettability (hydrophobicity) and low surface energy.

As described above, since the adhesive composition has a minimized difference in surface energy between before and after photocuring, it is advantageous to maintain a difference in contact angle between before and after photocuring within the range as set forth above in that the adhesive composition can maintain chemical resistance to hydrophobic solvents such as a halocarbon, dodecane and the like. Specifically, the adhesive composition may have a contact angle from about 50° to about 70° before and after photocuring. Within this range, it can be confirmed that the adhesive composition exhibits hydrophilicity even after photocuring.

Method for Preparing Adhesive Composition

In accordance with another aspect of the present invention, a method for preparing an adhesive composition includes: preparing a thermally curable epoxy resin formed of a hydroxyl group-containing epoxy copolymer; and mixing the thermally curable epoxy resin with a UV curable epoxy resin having an epoxy equivalent weight of about 10 g/eq to about 500 g/eq.

Preparation of the thermally curable epoxy resin may include: obtaining an epoxy copolymer by dissolving a hydroxyl group-containing epoxy monomer in a solvent; and preparing a thermally curable epoxy resin by addition polymerization of a thermal curing agent with the obtained epoxy copolymer.

In operation of obtaining the epoxy copolymer, as the solvent for dissolving the hydroxyl group-containing epoxy monomer, an organic solvent including ketones, ethers, aromatic organic solvents, preferably methylisobutylketone, methylethylketone, toluene, xylene, and the like may be used. The solvent may have a boiling point from 60° C. to about 120° C.

The thermal curing agent may be subjected to addition polymerization with the obtained epoxy copolymer, and may be present in an amount of about 0.1 parts by weight to about 0.5 parts by weight based on 100 parts by weight of the epoxy copolymer. The adhesive composition is aimed at minimizing a change of surface energy or contact angle by including a certain amount of hydroxyl groups to provide hydrophilicity even after photocuring. As such, the adhesive composition includes the thermal curing agent in the amount as set forth above, thereby securing a certain amount of hydroxyl groups even after polymerization of the hydroxyl group-containing epoxy copolymer with the thermal curing agent.

Further, when the amount of the thermal curing agent is maintained within the range as set forth above, the adhesive composition can have no problem in deep-portion curing and minimize a problem in storage stability upon coating the adhesive composition onto an upper side of a plastic substrate.

Furthermore, the thermal curing agent may include an isocyanate compound having one to three isocyanate groups. The isocyanate compound may include at least one selected from the group consisting of, for example, 2,4-toluene diisocyanate, 1,5-naphthalene diisocyanate, 2,6-toluene diisocyanate, 1,3-xylene diisocyanate, 1,4-xylene diisocyanate, 1,6-hexane diisocyanate, isophorone diisocyanate, isocyanate trimers, isocyanate trimer adducts, and 2,2,4-trimethyl hexamethylene diisocyanate, without being limited thereto.

The adhesive composition may include cationic photoinitiators, catalysts, polymerization inhibitors, and the like, which are added thereto, as needed. The thermal curing agent may be subjected to addition polymerization at about 60° C. to about 80° C. for about 2 hours to about 10 hours, specifically for about 3 hours to about 5 hours. Reaction may be terminated when there is no remaining thermal curing agent due to a urethane bond to the hydroxyl group-containing epoxy copolymer, as detected by an infrared spectrometer.

Hereinafter, the present invention will be described in more detail with reference to some examples. It should be understood that these examples are provided for illustration only and are not to be construed in any way as limiting the present invention.

PREPARATIVE EXAMPLE AND COMPARATIVE PREPARATIVE EXAMPLES

Preparative Example

Preparation of thermally curable epoxy resin

Components were introduced into a 2 L 5-neck flask, and the following reaction was performed. 600 g of xylene as an organic solvent and 400 g of an epoxy monomer (PKHH, Inchem Co., Ltd.), which has a molecular weight of about 50,000 and includes a hydroxyl group, were introduced. A reflux condenser was mounted to one neck, a thermometer was mounted to another neck, and a dropping funnel was mounted to another neck.

A solution in the flask was maintained at about 60° C. to about 80° C. and stirred at 170 rpm. After confirming that the solution had a homogenous phase by dissolution at the same temperature for 5 hours, 4 g of an isocyanate compound having an NCO % of about 10% to about 15% and 50 ppm of DBTDL were added to the solution. Next, the solution was maintained at 80° C. for 5 hours until an NCO peak disappeared.

Comparative Preparative Example 1

Preparation of Acrylic Polyol Resin

Components were introduced into a 2 L 5-neck flask, and the following reaction was performed. 600 g of xylene as an organic solvent and 400 g of an acrylic polyol, which has a molecular weight of about 120,000, were introduced. A reflux condenser was mounted to one neck, a thermometer was mounted to another neck, and a dropping funnel was mounted to another neck.

A solution in the flask was maintained at about 60° C. to about 80° C. and stirred at 170 rpm. After confirming that the solution had a homogenous phase by dissolution at the same temperature for 5 hours, 4 g of an isocyanate compound having an NCO % of about 10% to about 15% and 50 ppm of DBTDL were added to the solution. Next, the solution was maintained at 80° C. for 5 hours until an NCO peak disappeared.

Comparative Preparative Example 2

Preparation of Polyester Polyol Resin

Components were introduced into a 2 L 5-neck flask, and the following reaction was performed. 600 g of xylene as an organic solvent and 400 g of a polyester polyol (ES100, SK chemical Co., Ltd.), which has a molecular weight of about 20,000 and a glass transition temperature of 65° C., were introduced. A reflux condenser was mounted to one neck, a thermometer was mounted to another neck, and a dropping funnel was mounted to another neck.

A solution in the flask was maintained at about 60° C. to about 80° C. and stirred at 170 rpm. After confirming that the solution had a homogenous phase by dissolution at the same temperature for 5 hours, 4 g of an isocyanate compound having an NCO % from about 10% to about 15% and 50 ppm of DBTDL were added to the solution. Next, the solution was maintained at 80° C. for 5 hours until an NCO peak disappeared.

Examples and Comparative Examples

Example 1

22 g of the thermally curable epoxy resin prepared in Preparative Example 1, 15 g of a UV curable epoxy resin (cycloaliphatic novolac type epoxy resin, Dicle Co., Ltd., EEW: 177 g/eq, glass transition temperature: 75° C.), 60 g of methyl ethyl ketone, and 2.4 g of a cationic photoinitiator (UVI-6974, antimony-based) were placed in a reactor and stirred for 30 minutes or more, thereby preparing an adhesive composition.

Example 2

22 g of the thermally curable epoxy resin prepared in Preparative Example 1, 15 g of a UV curable epoxy resin (cycloaliphatic novolac type epoxy resin, Synasia Co., Ltd., EEW: 200 g/eq, glass transition temperature: room temperature or less), 60 g of methyl ethyl ketone, and 2.4 g of a cationic photoinitiator (UVI-6974, antimony-based) were placed in a reactor and stirred for 30 minutes or more, thereby preparing an adhesive composition.

Comparative Example 1

An adhesive composition was prepared in the same manner as in Example 1 except that the acrylic polyol resin prepared in Comparative Preparative Example 1 was used.

Comparative Example 2

An adhesive composition was prepared in the same manner as in Example 1 except that the polyester polyol resin prepared in Comparative Preparative Example 2 was used.

TABLE 1

| | Thermally curable epoxy resin | UV curable epoxy resin | | | |
|---|---|---|---|---|---|
| | | Type | Glass transition temp. | Epoxy equivalent weight | Cationic photoinitiator |
| Example 1 | Hydroxyl group-containing epoxy monomer Isocyanate compound | Novolac type epoxy resin | 75° C. | 177 g/eq | UVI-6974 (antimony-based) |
| Example 2 | Hydroxyl group-containing epoxy monomer Isocyanate compound | Novolac type epoxy resin | Room temp, or less | 200 g/eq | UVI-6974 (antimony-based) |
| Comparative Example 1 | Acrylic polyol Isocyanate compound | Novolac type epoxy resin | 75° C. | 177 g/eq | UVI-6974 (antimony-based) |
| Comparative Example 2 | Polyester polyol Isocyanate compound | Novolac type epoxy resin | 75° C. | 177 g/eq | UVI-6974 (antimony-based) |

Experimental Example 1

Gel Content

Each of the adhesive compositions of Examples and Comparative Examples prepared for property evaluation was coated onto a polyethylene terephthalate (PET) film using a No. 4 Mayer bar, followed by drying at 140° C. for 3 minutes, thereby obtaining a film having a thickness from 5 μm to 7 μm. Next, the film was subjected to UV irradiation for 10 seconds using a 200 mW UV curing machine. After completion of UV curing, 5 g of a specimen of the film was dipped into 20 g of a halocarbon or dodecane solvent, followed by aging in an oven at 80° C. for 12 hours. Next, a change in weight of the film was measured, thereby measuring gel content (Gel content (%)=Weight of insolubles (Gel)/Weight of initial specimen×100).

Experimental Example 2

Contact Angle

Each of the adhesive compositions of Examples and Comparative Examples was coated onto a PET film using a No. 4 Mayer bar, followed by drying at 140° C. for 3 minutes, thereby obtaining a B-stage (before photocuring) film having a thickness from 5 μm to 7 μm. The B-stage film was subjected to UV irradiation for 10 seconds using a 200 mW UV curing machine, thereby obtaining a C-stage (after photocuring) film. If the film is subjected to UV irradiation at a low dose of 0.5 J/cm$^2$ or less, since there can be residual tackiness on a surface after photocuring. Thus, measurement was performed at the same dose. Ultrapure water was dropped onto the C-stage film using a contact angle analyzer, thereby measuring a change of contact angle between before and after UV curing.

Experimental Example 3

Solvent Resistance

After gel content testing of <Experimental Example 1>, the adhesive composition was evaluated as to adhesion to a PET film and delamination. An adhesive composition, which was brought into close contact with the PET film and had no problem on a coating surface, was rated as Extremely Good; an adhesive composition which was not brought into close contact with the PET film and maintained a film shape through delamination was rated as Good; and the adhesive composition which suffered from delamination to lose a coated film shape was rated as Insufficient.

TABLE 2

| | | Example 1 | Exam-ple 2 | Comparative Example 1 | Comparative Example 2 |
|---|---|---|---|---|---|
| Gel content (%) | | 98 | 91 | 56 | 81 |
| Contact angle | B-stage (before photocuring) | 69 | 72 | 79 | 76 |
| | C-stage (after photocuring) | 72 | 89 | 101 | 97 |
| Solvent resistance | | Extremely Good | Good | Insufficient | Insufficient |

Referring to Table 2, it could be seen that the adhesive compositions of Examples 1 and 2 had a gel content of 90% or more and a difference in contact angle of about 5° to about 20° between before and after photocuring. It could be seen that, since the adhesive compositions of Examples 1 and 2 included the thermally curable epoxy resin formed of the hydroxyl group-containing epoxy monomer unlike those of Comparative Example 1 and 2, the adhesive compositions of Examples 1 and 2 exhibited hydrophilicity and thus entailed a small change of contact angle with respect to a highly hydrophobic solvent even after photocuring.

In addition, it could be inferred that, since the UV curable epoxy resins had different epoxy equivalent weights and different glass transition temperatures in Example 1 and 2, the epoxy equivalent weight and the glass transition temperature also influenced contact angle or solvent resistance of the adhesive compositions On the other hand, although the adhesive compositions of Comparative Examples 1 and 2 included the same UV curable epoxy resin as that of Example 1, use of the acrylic polyol and the polyester polyol, which had a relatively small amount of hydroxyl groups instead of the epoxy copolymer caused the adhesive compositions of Comparative Examples 1 and 2 to be severely exposed to a hydrophobic solvent due to an increased contact angle after photocuring and thus exhibited insufficient solvent resistance.

As a result, it can be seen that, in order to secure good chemical resistance with respect to halocarbons or dodecane which is a hydrophobic solvent generally used for electronic paper when the adhesive composition is applied to electronic paper, the adhesive composition exhibits hydrophilicity and has an advantage when maintaining a contact angle of 80 degrees or less and a gel content of 95% or more.

The invention claimed is:

1. An adhesive composition comprising: a thermally curable epoxy resin formed of a hydroxyl group-containing epoxy copolymer; and a UV curable epoxy resin having an epoxy equivalent weight of 100 g/eq to 500 g/eq, wherein
   the epoxy copolymer has a weight average molecular weight of 20,000 to 70,000; and
   the thermally curable epoxy resin has a hydroxyl group equivalent weight of 200 g/eq to 400 g/eq.

2. The adhesive composition according to claim 1, wherein the epoxy copolymer has a structure in which the hydroxyl group is substituted into a main chain thereof.

3. The adhesive composition according to claim 1, wherein the epoxy copolymer has a glass transition temperature of 50° C. to 90° C.

4. The adhesive composition according to claim 1, wherein the UV curable epoxy resin comprises a novolac type epoxy resin.

5. The adhesive composition according to claim 4, wherein the novolac type epoxy resin comprises any one selected from the group consisting of phenol novolac type, cresol novolac type, cycloaliphatic novolac type, cycloaliphatic novolac type modified, bisphenol novolac type, biphenyl novolac type, naphthol novolac type epoxy resins, and combinations thereof.

6. The adhesive composition according to claim 1, wherein the UV curable epoxy resin has a glass transition temperature of 60° C. to 90° C.

7. The adhesive composition according to claim 1, wherein the thermally curable epoxy resin is present in an amount of 10 parts by weight to 60 parts by weight based on 100 parts by weight of the UV curable epoxy resin.

8. The adhesive composition according to claim 1, further comprising: a cationic photoinitiator.

9. The adhesive composition according to claim 8, wherein the cationic photoinitiator is present in an amount of 5 parts by weight to 15 parts by weight based on 100 parts by weight of the UV curable epoxy resin.

10. The adhesive composition according to claim 1, wherein the adhesive composition has a difference in surface energy of 2 dyne/cm to 4 dyne/cm between before and after photocuring.

11. The adhesive composition according to claim 1, wherein the adhesive composition has a difference in contact angle of 5° C. to 20° C. between before and after photocuring.

* * * * *